United States Patent [19]

Feinland et al.

[11] 4,412,298
[45] Oct. 25, 1983

[54] METHOD FOR TRACKING CREEP AND DRIFT IN A DIGITAL SCALE UNDER FULL LOAD

[75] Inventors: Seymour Feinland; Arthur Rubinstein, both of Stamford, Conn.

[73] Assignee: Pitney Bowes Inc., Stamford, Conn.

[21] Appl. No.: 77,468

[22] Filed: Sep. 20, 1979

[51] Int. Cl.³ .................... G01G 23/14; G01G 19/413
[52] U.S. Cl. .................................... 364/567; 364/466; 364/571; 177/25
[58] Field of Search ............... 364/464, 466, 567, 571; 177/164, 165, 25

[56] References Cited

U.S. PATENT DOCUMENTS

| 3,916,173 | 10/1975 | Williams, Jr. et al. | 364/571 |
| 3,962,570 | 6/1976 | Loshbough et al. | 364/466 |
| 3,986,012 | 10/1976 | Loshbough et al. | 364/466 |
| 4,064,954 | 12/1977 | Rock | 177/25 |
| 4,139,069 | 2/1979 | Domis et al. | 364/567 |
| 4,139,892 | 2/1979 | Gudea et al. | 364/571 |
| 4,159,521 | 6/1979 | Hall et al. | 364/567 |
| 4,212,074 | 7/1980 | Kuno et al. | 364/567 |
| 4,236,222 | 11/1980 | Loshbough et al. | 364/567 |

Primary Examiner—Gary Chin
Attorney, Agent, or Firm—Peter Vrahotes; William D. Soltow, Jr.; Albert W. Scribner

[57] ABSTRACT

Method for tracking creep and drift of a digital scale after a load has been placed upon a scale pan. The tare weight is determined at a time before a load is placed upon the pan and is stored. After the pan comes to equilibrium, the gross weight of the scale is determined and stored. Variance in the gross weight as a result of creep and drift is tracked and after an incremental amount is determined the value of such variance is added to the stored tare weight so that upon removal of the load from the pan the true tare weight is maintained.

7 Claims, 4 Drawing Figures

METHOD FOR TRACKING CREEP AND DRIFT IN A DIGITAL SCALE UNDER FULL LOAD

BACKGROUND OF INVENTION

Digital scales of current design utilize automatic zero tracking techniques which eliminate the need for frequent operator intervention to readjust the tare weight. Such automatic zero tracking usually involves measuring sequential signals representative of the tare weight and continually replacing older signals with newer signals until such time as a load is placed on the pan. When the load is placed on the pan, the latest signal or signals would then be stored to be subsequently subtracted from the gross weight.

Prior methods of tracking have been with an empty pan only; consequently when a weight is left on a pan for any significant duration, deviation from zero can take place either as a result of electronic or load cell drifts. With typical load cell scales, significant change in the reading takes place after a heavy load is applied due to the creep of the load cell; however, the change in indicated weight immediately after the load is applied is unaffected. Thus, when a load is left on a scale and creep takes place, immediately after the load has been removed the zero reading has been displaced by the same change as the creep. In time, the scale would uncreep in a manner symmetrical with the original creep and depending on the original creep's rate and size, but a significant amount of time may elapse before zero is recaptured.

It therefore would be advantageous to have a system whereby the tare weight, or zero, is continually updated whether a load is upon the pan or not. With such a system, not only would time be saved in waiting until the tare weight has reached equilibrium after a load is removed from the pan, but also at the time the load is upon the pan the gross weight would not be accurate if creep and drift are not taken into account.

SUMMARY OF THE INVENTION

A method has been devised whereby the tare weight of a scale may be continually updated whether or not a load is received upon the pan of the scale. Before a load to be weighed is placed on the pan, the tare weight, or zero, is continuously updated by storing newer values and eliminating older values of the tare weight. This will continue until such time as a load is placed upon the pan, at which time the latest tare weight will be stored. The scale is allowed to reach equilibrium at which time the gross weight of the load will be measured and stored. At this time, the tare weight will be subtracted from the gross weight automatically and the net weight shown on some type of display. When the load is left upon the pan for an extended period, the creep and drift are continually monitored so that the stored tare weight can be adjusted in response thereto. The storing of the adjusted tare weight when a load is on the pan will result in a constant net weight being obtained.

DETAILED DESCRIPTION OF THE PREFERRED EMBODIMENT

Figure 1:
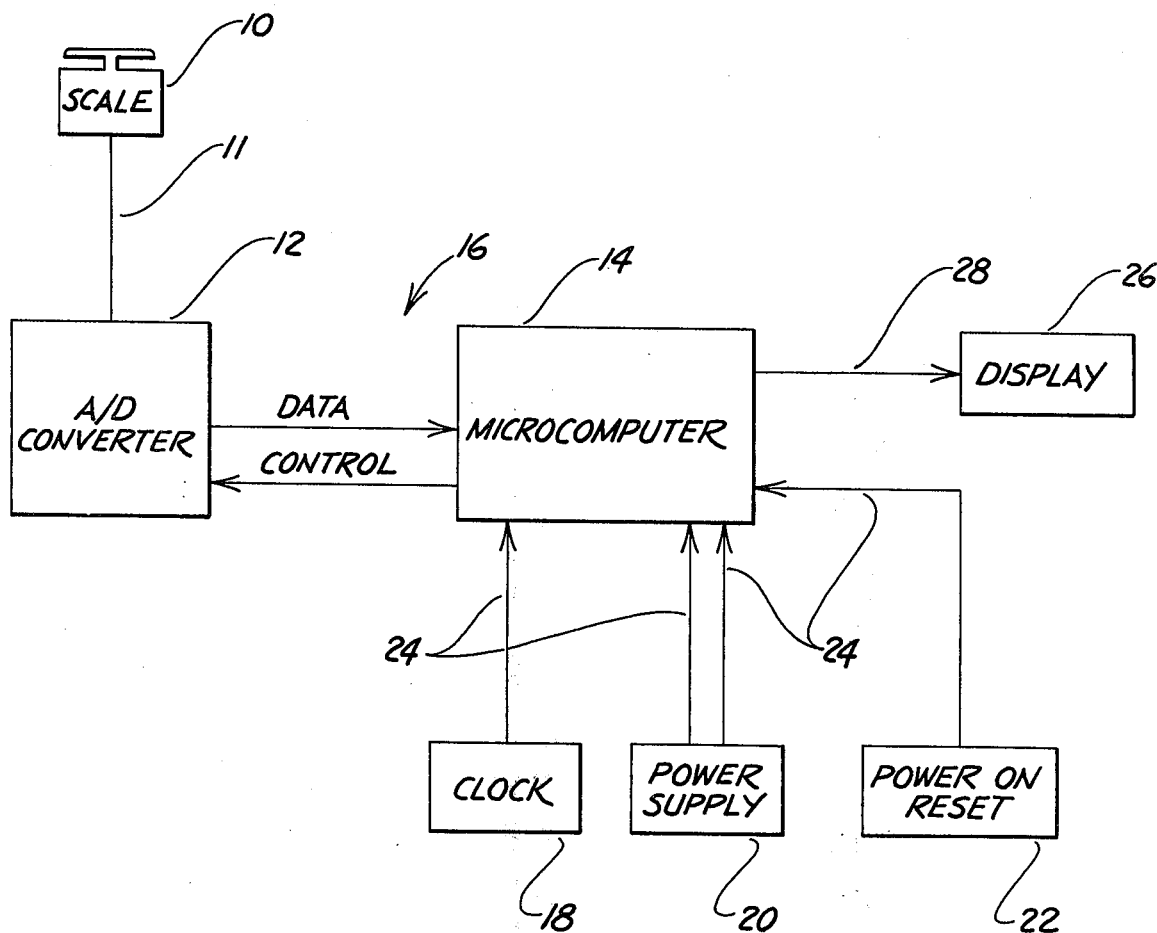
FIG. 1 shows a block diagram of the components utilized in the method of this invention.

Referring to FIG. 1, a microcomputer-driven computing scale system is shown. A weighing scale 10 capable of generating analog signals, such as Scale Model No. 5035 produced by Pitney Bowes, Inc., is electrically connected by means of an output line 11 to an analog to digital (A/D) converter 12. Included in the A/D converter 12 is control logic, such as TTL counters and gates. The A/D converter and control logic 12 is electrically connected to a microcomputer 14, such as Model No. PPS 4/1, produced by Rockwell International Company, by means of suitable input and output lines, shown generally at reference numeral 16. The microcomputer 14 has predetermined locations therein for storage registers, such as an R register, as hereinbelow described. These input and output lines 16 comprise a data line and a control line.

The microcomputer 14 is, in turn, connected to a clock 18, a power supply 20 and a POWER ON reset 22, by means of suitable input lines, shown generally at reference numeral 24. The microcomputer 14 is connected to a display 26, and drives the display 26 over a corresponding output line 28.

In operation, a weight or load is placed on the pan of the scale 10, which scale generates analog signals over the output line 11. The A/D converter 12 receives this analog signal and converts it to a digital number. The digital number is transmitted over output lines 16 to the microcomputer 14. The microcomputer 14 is powered by the power supply 20 and its associated POWER ON reset 22, by means of suitable lines 24. The clock 18, generates timing signals for the microcomputer 14 over a suitable line 24. The microcomputer 14 is used to calculate the weight of a load on the scale 10 represented by the signal generated therefrom. The weight is then displayed on the display 26 as a result of the signal generated from the microcomputer 14 over the output line 28.

INITIAL OPERATION

Figure 2:
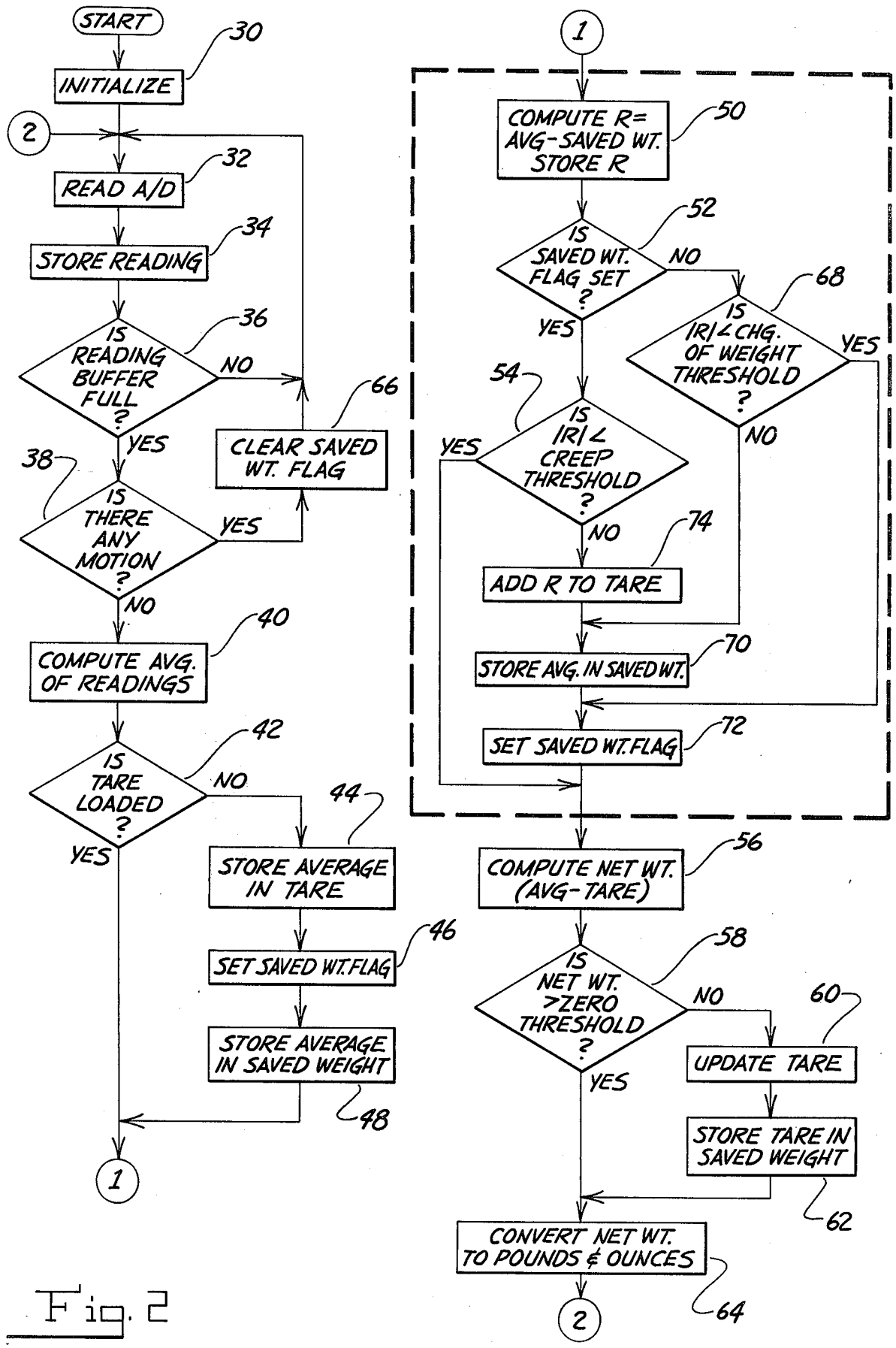
FIG. 2 is a flow chart of the logic involved in one embodiment of the instant invention.

Referring now also to FIG. 2, the microcomputer 14 performs the steps hereinafter described. As hereinafter used in this description, all reference numerals equal to or greater than reference numeral 30 refer to steps in the method hereinbelow described and are shown only in FIGS. 2 and 3. Similarly, all reference numerals less than 30 refer to elements shown only in FIG. 1. Before a weighing operation is begun, initialization 30 takes place. During initialization, all input/output (I/O) ports are cleared, all flags are cleared, and all variables are set to default values or to zero. The digital number generated by the A/D converter 12 is sent over the data output line 16 to the microcomputer 14. The number is read 32 and stored 34 in a READING buffer in the microcomputer 14. Digital values continue to be read into the READING buffer until the buffer is full 36. A comparison of these values is made to determine whether they vary significantly with respect to one another. This determination is shown at reference numeral 38. The significance of this determination is that when consecutive values do not vary significantly from one another over a given time interval, the pan of the scale 10 can be presumed to be at rest, or not in motion. Such is generally the case when the system first becomes operational with no load on the pan, or when the pan has had time to settle after a load is applied.

In the case of initial operation with no load on the pan of the scale 10, the answer to the question asked at reference numeral 38 (IS THERE ANY MOTION?), is negative. An average of the values in the READING buffer, hereinafter called AVERAGE, is then computed 40.

If no value has been loaded into a TARE register 42, as is the case in initial operation, the value calculated as AVERAGE is then loaded into the TARE register 44. A SAVED WEIGHT flag is set 46 and AVERAGE is also loaded into a SAVED WEIGHT register 48. A calculation is then performed, subtracting the value stored in the SAVED WEIGHT register from AVERAGE. The resulting difference is then stored in a register called the R register 50. In the case of initial operation, since AVERAGE had been previously loaded in the SAVED WEIGHT register, the value zero is loaded into the R register.

The system then determines whether the SAVED WEIGHT flag has been set 52. In the case of initial operation, the flag has been set. The system then determines whether the absolute value of the value loaded in the R register is within an arbitrary band called the CREEP THRESHOLD 54. In this embodiment, the CREEP THRESHOLD is set at 1/40th of an ounce. In the case of initial operation, since the value stored in the R register is zero, the answer to the question asked at reference numeral 54 (IS |R| LESS THAN THE CREEP THRESHOLD?), is affirmative. That is, zero is less than 1/40th of an ounce. The NET WEIGHT is then computed by subtracting the value in the TARE register from AVERAGE 56.

The system then determines whether the value calculated as NET WEIGHT is greater than an arbitrary band called the ZERO THRESHOLD 58. In this embodiment, the ZERO THRESHOLD is set at 1/15th of an ounce. In the case of initial operation, since AVERAGE was loaded into the TARE register, the computed NET WEIGHT is zero. Therefore, the answer to the question asked at reference numeral 58 (IS NET WEIGHT GREATER THAN THE ZERO THRESHOLD?), is negative. The value in the TARE register is then updated 60, and the value in the TARE register is then loaded into the SAVED WEIGHT register 62. The NET WEIGHT is then converted to pounds and ounces 64. Since no load is on the pan, this would be zero.

PRE-WEIGHING OPERATION

At this point, the system continues to process signals generated by the scale 10 and converted into digital numbers by the A/D converter 12. The microcomputer 14 reads the number generated by the A/D converter 12, shown at reference numeral 32. This reading is stored 34 and the oldest reading is discarded from the READING buffer 36.

It is conceivable that, after initial operation but before a weight is placed on the scale 10, slightly different readings will be received by the microcomputer 14 from the A/D converter 12 as a result of drift or noise. The system will then determine that there is motion of the pan 38, and will then clear the SAVED WEIGHT flag 66 before continuing to read a value from the A/D converter 12 shown at reference numeral 32. A cleared SAVED WEIGHT flag thus indicates that the pan of the scale 10 is in motion. When the scale 10 damps out, and no motion is detected, as determined by the comparison hereinbefore described at reference numeral 38, the system then computes the AVERAGE OF the values in the READING buffer 40. At this point, the TARE register had been previously loaded during initial operation. Consequently, the system does not execute the steps represented by reference numerals 44, 46 and 48, but rather computes the new AVERAGE minus the value in the SAVED WEIGHT register. The result of this computation is then stored in the R register 50.

At this point, the condition of the SAVED WEIGHT flag is again determined 52. Since this SAVED WEIGHT flag had previously been cleared, the system then determines whether the value in the R register is less than an arbitrary band called the CHANGE OF WEIGHT THRESHOLD 68. In this embodiment, the CHANGE OF WEIGHT THRESHOLD is set at 1/15th of an ounce. If the answer to this question (IS |R| LESS THAN THE CHANGE OF WEIGHT THRESHOLD?), is negative, AVERAGE is then stored in the SAVED WEIGHT register 70. If, however, the value in the R register is less than the CHANGE OF WEIGHT THRESHOLD, AVERAGE is not stored in the SAVED WEIGHT register. At this point, regardless of whether the new AVERAGE is stored in the SAVED WEIGHT register, the SAVED WEIGHT flag is set 72 and the NET WEIGHT is computed by subtracting the value in the TARE register from AVERAGE 56. Since no weight is on the pan of the scale 10, it is probable that the NET WEIGHT is not greater than the ZERO THRESHOLD band 58. Consequently, the TARE register must be updated 60. The value in the TARE register is stored also in the SAVED WEIGHT register 62. The NET WEIGHT is again converted to pounds and ounces 64.

WEIGHING OPERATION

For purposes of illustration, it is now desirable to consider the operation of the system when a force is applied to the pan of the scale 10. After a weight is placed on the pan, a digital number from the A/D converter 12 is entered and stored 34 into the READING buffer 36. Initially, of course, the pan will be in motion 38, so the SAVED WEIGHT flag is cleared 66 and reading of the digital numbers generated by the A/D converter 12 continues to be made as shown at reference numeral 32. When the system determines that there is no significant difference among the values read, the answer to the question asked at reference numeral 38 (IS THERE ANY MOTION?), is answered in the negative. A new AVERAGE is computed.

A value had previously been loaded in the TARE register, so the answer to the question asked at reference numeral 42 (IS TARE REGISTER LOADED?), is affirmative. The value in the SAVED WEIGHT register is now subtracted from the new AVERAGE and this result is stored in the R register 50. Because the SAVED WEIGHT flag had previously been cleared, the answer to the question asked at reference numeral 52 (IS SAVED WEIGHT FLAG SET?), is negative. The system then determines whether the absolute value of the value stored in the R register is less than the CHANGE OF WEIGHT THRESHOLD 68. If the answer to this question (IS |R| LESS THAN THE CHANGE OF WEIGHT THRESHOLD?), is negative, AVERAGE is then stored in the SAVED WEIGHT register 70. If, however, the value in the R register is less than the CHANGE OF WEIGHT THRESHOLD, AVERAGE is not stored in the SAVED WEIGHT register. At this point, regardless of whether the new AVERAGE is stored in the SAVED WEIGHT register, the SAVED WEIGHT flag is set 72 and the NET WEIGHT is computed by subtracting the value in the TARE register from AVERAGE 56.

At this weighing, the NET WEIGHT is most probably greater than the ZERO THRESHOLD band 58, so the system immediately converts the NET WEIGHT into pounds and ounces 64.

CREEP TRACKING OPERATION

Now consider the situation that arises after a weight has been determined to be on the pan of the scale 10 for a significant length of time. In this case, a digital number is read from the A/D converter 12, shown at reference numeral 32. The value is stored 34 in the READING buffer 36. It can be assumed that there is no significant motion of the pan on the scale 10, as shown at reference numeral 38. An AVERAGE is computed 40.

A value had been previously loaded into the TARE register, so the answer to the question asked at reference numeral 42 (IS TARE REGISTER LOADED?), is affirmative. The system then subtracts the value in the SAVED WEIGHT register from AVERAGE and stores this result in the R register 50. Note that since there was no motion of the pan, the SAVED WEIGHT flag is set. Consequently, the answer to the question asked at reference numeral 52 (IS SAVED WEIGHT FLAG SET?), is affirmative. The system then determines whether the absolute value of the value in the R register is less than the creep threshold 54. For purposes of illustration, it is assumed that the absolute value of the value in the R register is greater than the CREEP THRESHOLD. The value in the TARE register is then updated with a value consisting of the old TARE register value plus the value in the R register 74. The AVERAGE is then stored in the SAVED WEIGHT register 70 and the SAVED WEIGHT flag is set 72 (although this is a redundant step). The NET WEIGHT is computed by subtracting the new value in the TARE register from AVERAGE 56.

Since there is a significant weight on the scale 10, it is assumed that the new computed NET WEIGHT is greater than the ZERO THRESHOLD band 58, so the NET WEIGHT is immediately converted to pounds and ounces 64.

ALTERNATE EMBODIMENT—INITIAL OPERATION

Figure 3:
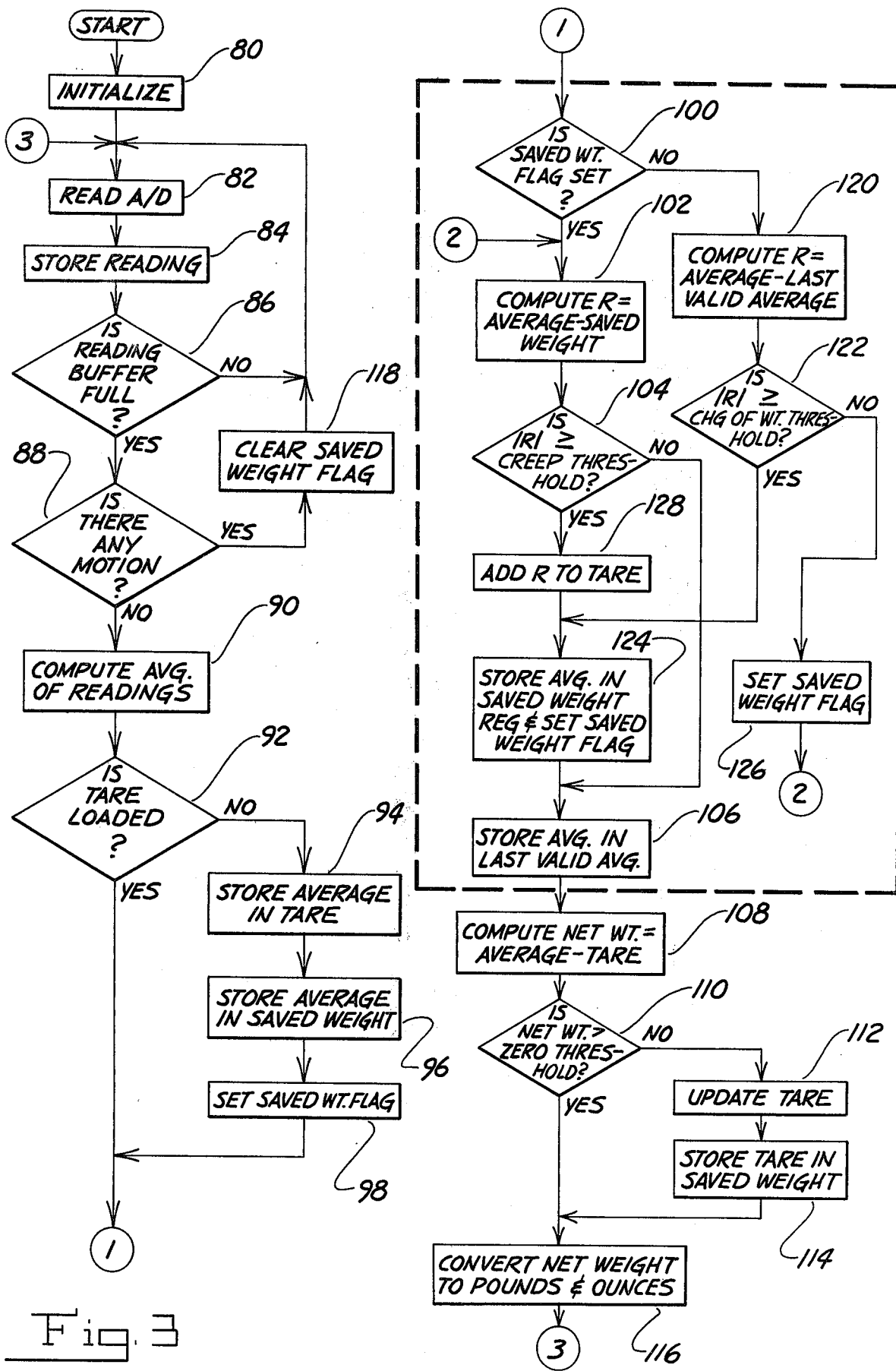
FIG. 3 is a flow chart of the logic involved in another embodiment of the instant invention.

Referring now to FIG. 3 in conjunction with FIG. 1, an alternate embodiment is hereinbelow described. The microcomputer 14 performs steps as follows. Before a weighing operation is begun, initialization 80 takes place. During initialization all input/output (I/O) ports are cleared, all flags are cleared, and all variables are set to default values or to zero. The digital number generated by the A/D converter 12 is sent over the data output line 16 to the microcomputer 14. The number is read 82 and stored 84 in a READING buffer in the microcomputer 14. Digital numbers continue to be read into the READING buffer until the buffer is full 86. A comparison of these values is made to determine whether they vary significantly with respect to one another. This determination is shown at reference numeral 88. The significance of this determination is that when consecutive values do not vary significantly from one another over a given time interval, the pan of the scale 10 can be presumed to be at rest or not in motion. Such is generally the case when the system first becomes operational with no load on the pan, or when a load on the pan has time to settle (i.e., scale dampening is completed).

In the case of initial operation with no load on the pan of the scale 10, the answer to the question asked at referenced numeral 88 (IS THERE ANY MOTION?), is negative. An average of the values in the READING buffer, hereinafter called AVERAGE, is then computed 90.

If no value has been loaded into the TARE register 92, as is the case in initial operation, the value calculated as AVERAGE is been loaded into the TARE register 94. The AVERAGE is loaded into a SAVED WEIGHT register 96 and a SAVED WEIGHT flag is also set 98.

The system then determines whether the SAVED WEIGHT flag has been set 100. In the case of initial operation, the flag has been set. The system then performs a calculation, subtracting the value stored in the SAVED WEIGHT register from AVERAGE 102. The resulting difference is then stored in a register called the R register 102. In the case of initial operation, since AVERAGE has been previously loaded in the SAVED WEIGHT register, the value zero is loaded into the R register. The system then determines whether the absolute value of the value loaded in the R register is within the arbitrary band called the CREEP THRESHOLD 104. In this embodiment, the CREEP THRESHOLD is set at 1/40th of an ounce. In the case of initial operation, since the value stored in the R register is zero, the answer to the question asked at reference numeral 104 (IS |R| GREATER THAN OR EQUAL TO THE CREEP THRESHOLD?), is negative. That is, zero is not greater than 1/40th of an ounce. The AVERAGE is stored in a LAST VALID AVERAGE register 106. The NET WEIGHT is then computed by subtracting the value in the TARE register from AVERAGE 108.

The system then determines whether the value calculated as NET WEIGHT is greater that the arbitrary band called the ZERO THRESHOLD 110. In this embodiment, the ZERO THRESHOLD is set at 1/15th of an ounce. In the case of initial operation, since AVERAGE was loaded into the TARE register, the computed NET WEIGHT is zero. Therefore, the answer to the question asked at reference numeral 110 (IS NET WEIGHT GREATER THAN THE ZERO THRESHOLD?), is negative. The value in the TARE register is then updated if required 112, and the value in the TARE register is loaded into the SAVED WEIGHT register 114. The NET WEIGHT is the converted to pounds and ounces 116. Since no load is on the pan, this would be zero.

PRE-WEIGHING OPERATION

At this point the system continues to process signals generated by the scale 10 and converted into digital numbers by the A/D converter 12. The microcomputer 14 reads the signals generated by the A/D converter 12, shown at reference numeral 82. Once again, these readings are stored 84 in the READING buffer 86.

It is conceivable that, after initial operation but before a weight is placed on the scale 10, slightly different readings will be received by the microcomputer 14 from the A/D converter 12 as a result of drift or noise.

The system will then determine that there is motion of the pan 88 and will then clear the SAVED WEIGHT flag 118 before continuing to read values from the A/D converter shown a reference numeral 82. A cleared SAVED WEIGHT flag thus indicates that the pan of the scale 10 is in motion. When the scale 10 damps out, and no motion is detected, as determined by the comparison hereinbefore described at reference numeral 88, the system then computes the AVERAGE of the values in the READING buffer 90. At this point, the TARE register had been previously loaded during initial operation. Consequently, the system does not execute the steps represented by reference numerals 94, 96 and 98, but rather determines whether the SAVED WEIGHT flag is set 100. Since this SAVED WEIGHT flag had previously been cleared, the system then subtracts the value stored in the LAST VALID AVERAGE register from the AVERAGE, and stores this value in the R register 120. The system then determines whether the value in the R register is greater than or equal to the CHANGE OF WEIGHT THRESHOLD 122. In this embodiment, the CHANGE OF WEIGHT THRESHOLD is set at 1/15th of an ounce. If the answer to this question (IS |R| GREATER THAN THE CHANGE OF WEIGHT THRESHOLD?), is affirmative, AVERAGE is then stored in the SAVED WEIGHT register and the SAVED WEIGHT flag is set 124. If, however, the value in the R register is less than the CHANGE OF WEIGHT THRESHOLD, AVERAGE is not stored in the SAVED WEIGHT register. However, note that the SAVED WEIGHT flag is nevertheless set 126. At this point, a new value is computed for the R register, by subtracting the value in the SAVED WEIGHT register from AVERAGE 102. The system then determines whether the absolute value of the value in the R register is greater than or equal to CREEP THRESHOLD 104. If this absolute value is greater, than the value of R is added to the TARE register 128, the average is stored in the SAVED weight register and the SAVED weight flag is set 124. If the absolute value of the value in the R register is less than the CREEP THRESHOLD, the system then performs the step immediately after reference numeral 124. That is, the AVERAGE is stored in the LAST VALID AVERAGE register 106 and the NET WEIGHT is computed 108. The system then determines whether the NET WEIGHT is greater than the value of the ZERO THRESHOLD 110. The NET WEIGHT is eventually converted to pounds and ounces 116.

WEIGHING OPERATIONS

For purposes of illustration, it is now desirable to consider the operation of the system when a force is applied to the pan of the scale 10. After a weight is placed on the pan, digital numbers from the A/D converter 12 are entered and stored 84 into the READING buffer 86. Initially, of course, the pan will be in motion 88, so the SAVED WEIGHT FLAG is cleared 118 and reading of the digital pulses generated by the A/D converter 12 continues to be made as shown at reference numeral 82. When the system determines that there is no significant difference among the values read, the answer to the question asked at reference numeral 88 (IS THERE ANY MOTION?), is answered in the negative. A new AVERAGE is computed.

A value had previously been loaded in the TARE register, so the answer to the question asked at reference numeral 92 (IS TARE REGISTER LOADED?), is affirmative. Once again, the system determines whether the SAVED WEIGHT flag is set 100. Since this SAVED WEIGHT flag had previously been cleared, the answer to this question is negative. The system then subtracts the value in the LAST VALID AVERAGE register from the AVERAGE 120. The system then determines whether the absolute value of the value stored in the R register is greater than or equal to the CHANGE OF WEIGHT THRESHOLD 122. If the answer to this question (IS |R| GREATER THAN OR EQUAL TO THE CHANGE OF WEIGHT THRESHOLD?), is affirmative, AVERAGE is then stored in the SAVED WEIGHT register and the SAVED WEIGHT flag is set 124. If, however, the value in the R register is less than the CHANGE OF WEIGHT THRESHOLD, AVERAGE is not stored in the SAVED WEIGHT register, but the SAVED WEIGHT flag is nevertheless set 126.

At this weighing the NET WEIGHT is most probably greater than the ZERO THRESHOLD band 110, so this system immediately converts the NET WEIGHT into pounds and ounces 116.

CREEP TRACKING OPERATION

Finally, consider the situation that arises when a weight is placed on the pan of the scale 10 for a significant length of time. In this case, digital numbers are read from the A/D converter 12 shown at reference numeral 82. Values are stored 84 in the READING buffer until the READING buffer is full 86. It can be assumed that there is no significant motion of the pan on the scale 10, as shown at reference numeral 88. An AVERAGE is computed 90.

A value had been previously loaded into the TARE register, so the answer to the question asked at reference numeral 92 (IS TARE REGISTER LOADED?), is affirmative. The system then determines whether the SAVED WEIGHT flag is set 100. Since there was no motion of the pan, the SAVED WEIGHT flag is set. Consequently, the answer to the question asked at reference numeral 100 (IS SAVED WEIGHT FLAG SET?), is affirmative. The system then subtracts the value in the SAVED WEIGHT register from AVERAGE and stores this result in the R register 102. The system then determines whether the absolute value of the value stored in the R register is greater than or equal to the CREEP THRESHOLD 104. If the answer to this question is affirmative, the value in the R register is added to the existing value in the TARE register 128. The AVERAGE is then stored in the SAVED WEIGHT register and the SAVED WEIGHT flag is set 124. The AVERAGE is then also stored in the LAST VALID AVERAGE register 106. The NET WEIGHT is then computed 108.

Since there is a significant weight on the scale 10, it is assumed that the new computed NET WEIGHT is greater than the ZERO THRESHOLD AND 110, so the NET WEIGHT is immediately converted to pounds and ounces 116.

Figure 4:
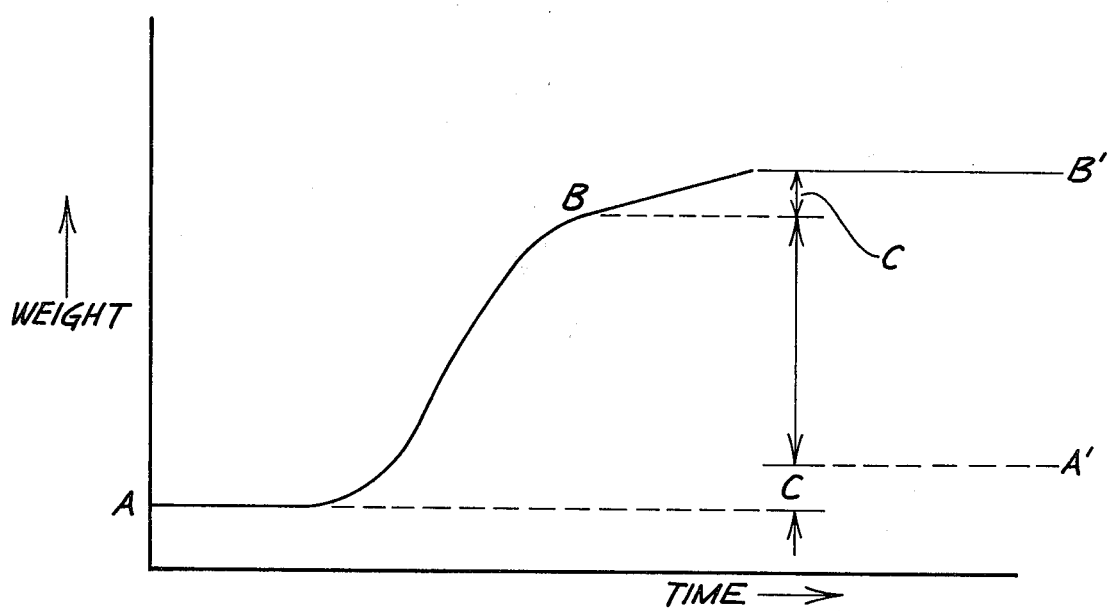
FIG. 4 is a graph of the measurement by a scale of gross weight and net weight as a function of time.

From the foregoing description of both embodiments of the present invention, it can be seen that a new method of tracking creep and drift of a digital scale has been disclosed. If, as a result of obtaining values over a period of time, the microcomputer system determines that the scale has crept or drifted substantially (i.e., beyond an arbitrary predetermined band); an adjustment is made to nullify the effects of such creep and drift. Reference is made to FIG. 4 wherein A represents the tare weight and B represents the gross weight after a load is placed on the pan. Obviously, B-A would yield the net weight. In the example reported by FIG. 4, the gross weight indication is shown increasing as a result of creep and drift in an exagerated manner for purposes of illustration by an amount C. When C exceeds a predetermined value, as previously described, the value of B+C will be stored as the new gross weight B and the value C will be added to the stored tare weight A to give a new tare weight A' which is stored in place of A. A' will be subtrated from B' to yield the true net weight. Additionally, when the load is removed from the pan the true tare weight A' will be stored so that a zero reading is displayed immediately.

What is claimed is:

1. A method for tracking creep and drift in an electronic scale during the period when a load remains on the scale, comprising:
   (a) continuously updating the tare weight of the scale prior to placing said load on the scale;
   (b) placing a load on the scale;
   (c) storing the current tare weight recorded at the time the load is placed upon the scale;
   (d) storing the gross weight of the load;
   (e) tracking the variance in the gross weight as a result of creep and drift; and
   (f) updating the stored tare weight by adding thereto the variance in the gross weight while the load remains on the scale.

2. A method of compensating for creep in an electronic scale, comprising:
   (a) storing a plurality of digital numbers generated by the scale representative of a weight;
   (b) continually sampling the digital numbers until none of the digital numbers vary significantly with respect to one another;
   (c) computing an average of the digital numbers;
   (d) storing the first average as a tare weight;
   (e) establishing a creep threshold;
   (f) repeating the steps of (a) through (c) to obtain a second average;
   (g) computing the difference between the first and second averages;
   (h) adjusting the tare weight to compensate for creep thereof by adding thereto the difference between the first and second averages if said difference exceeds the creep threshold; and
   (i) subtracting the updated tare weight from the second average to obtain a net weight.

3. A method of compensating for creep and drift in an electronic scale after a load is placed on the pan of the scale, comprising:
   (a) continuously updating a value representative of a tare weight;
   (b) sensing whether a load is placed on the pan;
   (c) discontinuing the tare weight value updating when a load is placed on the pan and storing the updated tare weight;
   (d) obtaining a first value representative of the gross weight on the scale;
   (e) storing the first value;
   (f) obtaining a second value representative of the gross weight on the scale;
   (g) storing the second value;
   (h) computing the difference between the first and second values;
   (i) establishing a creep threshold; and
   (j) updating the tare weight value to compensate for creep thereof by adding thereto the difference when the difference between the first and second values is greater than the creep threshold and no load has been placed on the pan during the interval between the time at which the first value has been obtained and the time at which the second value has been obtained.

4. The method of claim 3, including calculating the net weight of the load on the pan after each value of the gross weight on the scale has been obtained by subtracting the updated tare weight value from the value representative of the gross weight.

5. The method of claim 3, further comprising:
   (k) establishing a change of weight threshold; and
   (l) discontinuing the tare weight value updating as recited in step (j) when the difference between the first and second values exceeds the change of weight threshold.

6. The method of claim 5 including calculating the net weight of the load on the pan after each value of the gross weight on the scale has been obtained, by subtracting the updated tare weight value from the value representative of the gross weight.

7. The method of claim 3 wherein said first value representative of the gross weight on the scale is an average of a plurality of values and the second value representative of the gross weight on the scale is an average of a plurality of values.

* * * * *